(12) United States Patent
Weaver

(10) Patent No.: US 7,315,664 B2
(45) Date of Patent: Jan. 1, 2008

(54) METHOD OF IDENTIFYING AND LABELING OPTICAL CONDUITS

(75) Inventor: Thomas L. Weaver, Webster Groves, MO (US)

(73) Assignee: The Boeing Company, Chicago, IL (US)

( * ) Notice: Subject to any disclaimer, the term of this patent is extended or adjusted under 35 U.S.C. 154(b) by 203 days.

(21) Appl. No.: 10/862,984

(22) Filed: Jun. 8, 2004

(65) Prior Publication Data

US 2005/0271316 A1    Dec. 8, 2005

(51) Int. Cl.
*G02B 6/34*    (2006.01)
*H04J 4/00*    (2006.01)
*H04J 14/00*   (2006.01)

(52) U.S. Cl. .......................... 385/10; 385/37; 398/77; 398/78

(58) Field of Classification Search .................. 385/10, 385/37; 398/77, 78, 190; 356/305, 328
See application file for complete search history.

(56) References Cited

U.S. PATENT DOCUMENTS

| | | | | |
|---|---|---|---|---|
| 3,728,521 A | * | 4/1973 | Borough et al. | 235/488 |
| 4,953,933 A | * | 9/1990 | Asmar | 385/124 |
| 6,628,864 B2 | * | 9/2003 | Richardson et al. | 385/37 |
| 6,892,001 B2 | * | 5/2005 | Ohta et al. | 385/37 |
| 7,146,078 B2 | * | 12/2006 | Sasaki | 385/37 |
| 2004/0136652 A1 | * | 7/2004 | Groves-Kirkby | 385/37 |
| 2005/0089328 A1 | * | 4/2005 | Nishiki et al. | 398/77 |

* cited by examiner

*Primary Examiner*—Kevin S. Wood
(74) *Attorney, Agent, or Firm*—Harness, Dickey & Pierce, P.L.C.

(57) ABSTRACT

A method for labeling or coding optical conduits is disclosed. The method includes providing an optical conduit, and utilizing reflected light resulting from the transmission of at least one light pulse along the optical conduit to generate a multi-digit code. Still further, the method includes utilizing the multi-digit code to distinguish the optical conduit from other optical conduits. The utilization of Bragg gratings to code or label optical conduits with a unique multi-digit code is also disclosed.

11 Claims, 1 Drawing Sheet

METHOD OF IDENTIFYING AND LABELING OPTICAL CONDUITS

BACKGROUND OF THE INVENTION (1) Field of the Invention

This invention pertains to the field of fiber optics and optical data transmission. More particularly, this invention pertains to the use of Bragg gratings to code or label optical conduits with unique multi-digit identification numbers or codes that can be read by light from any point along such optical conduits. The identification codes facilitate rapid identification optical conduits.

(2) Background

When servicing data transmission cables, one is often required to be able to distinguish data conduits from each other. In the case of electrical data transmission conduits, it is known to utilize unique resistors attached along such conduits to serve as identification markers or labels. This allows service personnel to identify a particular conduit from other adjacent conduits by simply passing an electrical current along the conduit. However, optical data conduits are not amenable to such use of electrical resistors as markers. Thus, distinguishing optical conduits from each other remains a difficult task.

It is known that an optical time domain reflectometer can be used to identify the time domain reflection signature of light pulses transmitted along an optical conduit. Because each optical coupling and other imperfections along an optical conduit create a reflection, each optical conduit generally has a unique reflection signature. However, without prior knowledge of the reflection signature of a particular optical conduit, the optical conduit can not be identified simply by measuring its reflection signature. Moreover, as an optical conduit is repaired or otherwise altered, its reflection signature changes.

The inventor of the present invention has appreciated the desirability of a method capable of quickly identifying a particular optical conduit from amongst other optical conduits, from any location along the optical conduit. For example, in a situation where a cable of numerous optical conduits has been severed, the inventor appreciates that is desirable to quickly identify the separate portions of a particular conduit that should be rejoined, without needing specific familiarity with the cable or the particular optical conduit. The present inventions achieves these desired results and provides other advantages.

SUMMARY OF THE INVENTION

In a first aspect of the invention, a method comprises a step of providing first and second optical conduits. The first optical conduit has a first series of Bragg gratings therealong and the second optical conduit has a second series of Bragg gratings therealong. The first series of Bragg grating is different from the second series of Bragg gratings. The method further comprises a step of distinguishing the first optical conduit from the second optical conduit by identifying the first series of Bragg gratings via reflected light resulting from the transmission of at least one light pulse along the first optical conduit.

In another aspect of the invention, a method comprises a step of providing an optical conduit. A portion of the optical conduit is figuratively divisible into a plurality of segments connected in series with each other. The method further comprises a step of labeling the optical conduit with a multi-digit binary code by forming light reflecting portions along the optical conduit in a manner such that some of the segments of the optical conduit each contain at least one of the light reflecting portions and such that the other of the segments are devoid of any of the light reflecting portions. The multi-digit binary code comprises a series of digits each of which is associated with a separate one of segments of the optical conduit and each of which has one of alternative first and second states. Each digit that is associated with one of the segments containing at least one of the light reflecting portions is in the first state and each digit that is associated with one of the segments that are devoid of any of the light reflecting portions is in the second state. The method further comprises a step of utilizing reflected light resulting from the transmission of the at least one light pulse along the optical conduit to identify the multi-digit binary code of the optical conduit. Furthermore, the method comprises a step of utilizing the multi-digit binary code to distinguish the optical conduit from other optical conduits.

In yet another aspect of the invention, method comprises a step of providing an optical conduit. This method further comprises a step of utilizing reflected light resulting from the transmission of at least one light pulse along the optical conduit to generate a multi-digit code. Still further, this method comprises a step of utilizing the multi-digit code to distinguish the optical conduit from other optical conduits.

While the principal advantages and features of the invention have been described above, a more complete and thorough understanding of the invention may be obtained by referring to the drawings and the detailed description of the preferred embodiment, which follow.

Figure 1:
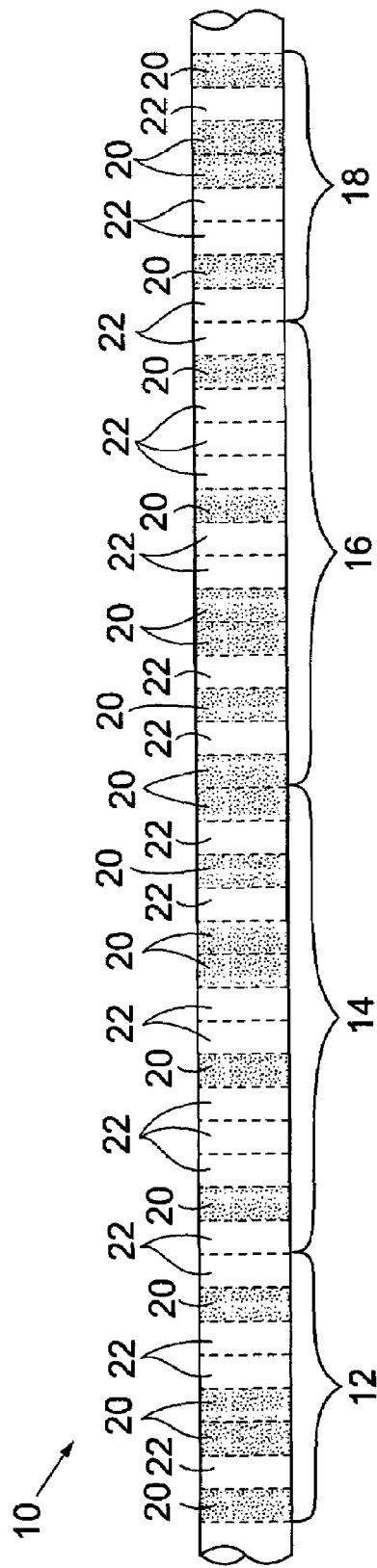
FIG. 1 is a schematic representation of an identification label formed in a portion of a first optical conduit in accordance with the preferred method of practicing the invention.

Reference characters in the written specification indicate corresponding items shown throughout the drawing figures.

DETAILED DESCRIPTION OF THE PREFERRED EMBODIMENT OF THE INVENTION

The preferred method of practicing the invention comprises providing at least one optical conduit. Such an optical conduit can be a single monolithic strand of optical fiber or ribbon, or may include a plurality of optical fibers, optical ribbons, or the like operatively connected in series via optical connectors or other devices. Additionally, the preferred method of practicing the involves the marking, labeling, or coding each of at least two optical conduits with distinct codes. The two optical conduits may form portions of a single optical cable that is comprised of many optical conduits, or may have completely different routings from each other.

In practicing the preferred method of the invention, a code is formed in a first optical conduit by creating a series of Bragg gratings along a portion of the first optical conduit. Preferably, the portion of the optical conduit is a monolithic portion of optical fiber or ribbon. FIG. 1 exemplifies such a portion of a first optical conduit 10.

The code formed in the portion of the first optical conduit 10 can be figuratively divided into first 12, second 14, third 16, and fourth 18 sections. Similarly, each of these sections can be figuratively divided into a plurality of adjacent segments 20,22. To form the code, a series of Bragg gratings are formed into the first 12, second 14, third 16, and fourth 18 sections in a manner such that some of the segments 20 contain a Bragg grating and such that some of the segments 22 lack such Bragg gratings. As can be appreciated by a person skilled in the relevant art, each of the segments can represent a digit of the particular code wherein the presence or absence of Bragg gratings in a particular segment determines the value of the particular digit associated with that segment. For example, the presence of a Bragg grating in a given segment can represent that the digit associated with such segment is assigned a value of one, while the absence of a Bragg grating in such segment can represent that the digit is assigned a value of zero. Thus, in essence, the code can be a multi-digit binary code of ones and zeros. As such, referring to FIG. 1, it should be appreciated that the series of Bragg gratings formed in the portion of the first optical conduit 10 can represent the multi-digit binary code "10110010010001001101011010110010001001001101".

Figure 2:
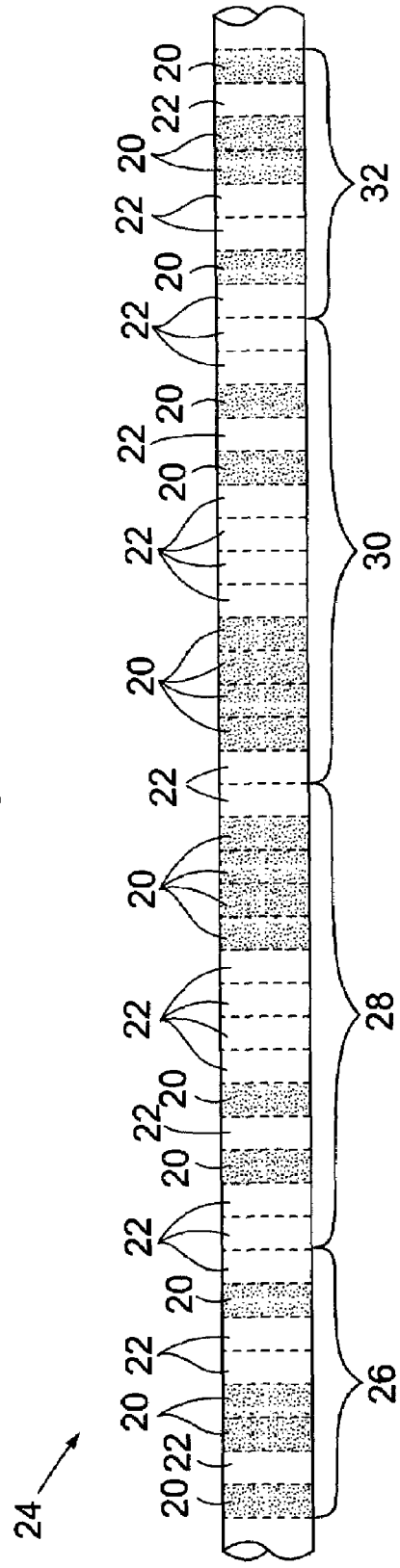
FIG. 2 is a schematic representation of a different identification label formed in a portion of a second optical conduit in accordance with the preferred method of practicing the invention.

In a similar manner, a different code can be formed in a second optical conduit by creating a different series of Bragg gratings along a portion of the second optical conduit. FIG. 2 exemplifies such a portion of a second optical conduit 24. Like the portion of the first optical conduit 10, the portion of the second optical conduit can be figuratively divided into first 26, second 28, third 30, and fourth 32 sections, each of which can be further divided into a plurality of segments with Bragg gratings 20, and a plurality of segments without such gratings 22. Thus, referring to FIG. 2, the series of Bragg gratings formed in the second optical conduit 24 could represent the multi-digit binary code "10110010001010000111100111100001010001001101". Preferably, the first section 12 of the code formed in the portion of the first optical conduit 10 is identical to the first section 26 of the code formed in the portion of the second optical conduit 24. Thus, as exemplified in FIGS. 1 and 2, the first section 12 of the code formed in the portion of the first optical conduit 10, and the first section 26 of the code formed in the portion of the second optical conduit 24, each represent the binary string "10110010". As explained below, this binary string can serve as a locator sequence to identify the starting location of each code. Additionally, as shown, the third section 16,30 of each of the of the codes formed in the portions of the first 10 and second 24 optical conduits can be mirror images of the respective second section 14,28 of each of the of the codes formed in the portions of the first and second optical conduits. Likewise, as is also shown, the fourth section 18,32 of each of the of the codes formed in the portions of the first 10 and second 24 optical conduits can be mirror images of the first section 12,26 of each of the of the codes formed in the portions of the respective first and second optical conduits. As such, each of the of the codes formed in the portions of the first 10 and second 24 optical conduits is essentially a palindrome and therefore is the same multi-digit code regardless of the direction in which it is read.

In practice, each of a plurality of optical conduits can be labeled or coded with a unique code as described above. Moreover, any given optical conduit can be marked or labeled with a particular code at several locations periodically along its length.

Once a particular optical conduit has been labeled, the code of the optical conduit can easily be read using, for example, an optical time domain reflectometer (OTDR). This is done by transmitting one or more light pulses along the optical conduit via the OTDR and thereafter recording the light reflection pattern of such pulse or pulses to generate a time domain reflection pattern. As should be appreciated by persons skilled in the art, the time domain reflection pattern will include the reflection information from each Bragg grating of the series of Bragg gratings forming the code. Additionally, the time domain reflection pattern may include reflection information resulting from any optical connectors along the optical conduit and from imperfections or other discontinuities along the optical conduit. However, the reflection pattern of the code can be extracted from the reflection pattern. To this end, the locator sequence, which preferably is included in all of the codes labeled on each of the optical conduits can serve as a means for easily identifying the code portion of the reflection information from the other reflection information. Thus, with the reflection pattern of the code identified, the reflection pattern can easily be ascertained and converted into a digital multi-digit code.

In some situations, the code of each of a particular group of optical conduits may be known prior to attempting to identify any particular one of the optical conduits from the others. For example, each optical conduit of an aircraft control system may labeled with a known code when such an aircraft is produced. Thus, the identity of any particular optical conduit could be ascertained simply by scanning the code of such optical conduit and comparing that code to the known code data. This would enable service personnel to quickly identify a particular optical conduit without tracing its routing or performing other complex analysis.

In other situations, the invention may be useful even if the code provides a person using the invention with no information other than the code itself. For example, the invention is practical in a situation such as where a buried optical cable comprised of numerous optical conduits has been severed into two halves. In such a situation, a service person seeking to reconnect one of the severed ends of each of the optical conduits to its respective other severed end can utilize the invention to ascertain the code of one of the severed conduits in a first one of the halves of the cable. The service person can then utilize the invention to scan the severed conduits in the other half of the cable until a severed conduit having a matching code is located. At this point, the service person would know that the served ends of the conduits having matching codes should be reconnected to each other. The remaining optical conduits can be rejoined in similar manner. Thus these advantages of the invention and others should be appreciated.

It should also be appreciated that the length of each of the segments that represent each digit of the code or label on a particular optical conduit is preferably related to the resolution of the type of OTDR that will likely be used to read the code. For example, some OTDRs are only capable of measuring time domain reflection patterns at resolutions of microsecond increments, while other OTDRs can obtain resolutions of nanosecond increments. In view of the speed at which light travels along an optical conduit, the resolution of the OTDR translates into a minimum distance between light reflections needed to ensure that the OTDR will observe the light reflections as separate reflections. In the case of microsecond resolutions, each segment of a code may be several hundred feet long in order for each adjacent segment to be discretely read. However, in the case of nanosecond increments, the segments may only need to be several inches in length. With technology in the filed of optical data transfer rapidly advancing, increasing resolutions will undoubtedly be developed that will further decrease the length of the segments needed to form any given code. It should also be appreciated that while a segment of a code or label may be many feet long, a Bragg grating along just a small portion of the segment may serve to distinguish the segment from a non-Bragg grated segment. In other words, the entire length of a segment does not necessarily need to be Bragg grated.

While the present invention has been described in reference to a specific embodiment, in light of the foregoing, it should be understood that all matter contained in the above description or shown in the accompanying drawings is intended to be interpreted as illustrative and not in a limiting sense and that various modifications and variations of the invention may be constructed without departing from the scope of the invention defined by the following claims. For example, while the preferred method of practicing the invention results in a code having a locator sequence and that is a palindrome, the code need not necessarily have such attributes. Thus, other possible variations and modifications should be appreciated.

Furthermore, it should be understood that when introducing elements of the present invention in the claims or in the above description of the preferred embodiment of the invention, the terms "comprising," "including," and "having" are intended to be open-ended and mean that there may be additional elements other than the listed elements. Similarly, the term "portion" should be construed as meaning some or all of the item or element that it qualifies.

What is claimed is:

1. A method comprising:
   providing a first optical conduit, a portion of the optical conduit being figuratively divisible into a plurality of segments connected in series with each other;
   labeling the first optical conduit with a multi-digit binary code by forming light reflecting portions along the first optical conduit in a manner such that some of the segments of the first optical conduit each contain at least one of the light reflecting portions and such that the other of the segments are devoid of any of the light reflecting portions, the multi-digit binary code comprising a series of digits each of which is associated with a separate one of segments of the first optical conduit and each of which has one of alternative first and second states, each digit that is associated with one of the segments containing at least one of the light reflecting portions being in the first state and each digit that is associated with one of the segments being devoid of any of the light reflecting portions being in the second state;
   providing a second optical conduit, a portion of the second optical conduit being figuratively divisible into a plurality of segments connected in series with each other;
   labeling the second optical conduit with a multi-digit binary code by forming light reflecting portions along the second optical conduit in a manner such that some of the segments of the second optical conduit each contain at least one of the light reflecting portions and such that the other of the segments are devoid of any of the light reflecting portions, the multi-digit binary code comprising a series of digits each of which is associated with a separate one of segments of the second optical conduit and each of which has one of alternative first and second states, each digit that is associated with one of the segments containing at least one of the light reflecting portions being in the first state and each digit that is associated with one of the segments being devoid of any of the light reflecting portions being in the second state, the multi-digit binary code labeled on the second conduit being distinct from the multi-digit binary code labeled on the first optical conduit;
   utilizing reflected light resulting from the transmission of at least one light pulse along the first and second optical conduits to identify the multi-digit binary code of the optical conduit; and
   utilizing the multi-digit binary code to distinguish the first optical conduit from the second optical conduit.

2. A method in accordance with claim 1, wherein the light reflecting portions formed during labeling of the first and second optical conduits with a multi-digit binary code are formed by creating Bragg gratings.

3. A method in accordance with claim 1 wherein the plurality of segments into which the portion of the first and second optical conduits is figuratively divisible are equal in length to each other.

4. A method in accordance with claim 1 wherein labeling the first and second optical conduits with the multi-digit binary code occurs in a manner such that the code is a palindrome.

5. A method in accordance with claim 1 wherein a multi-digit portion of the multi-digit binary code of the first optical conduit is identical to a multi-digit portion of the multi-digit binary code of the second optical conduit.

6. A method in accordance with claim 1, wherein utilizing reflected light resulting from the transmission of the at least one light pulse along the first and second optical conduits to identify the multi-digit binary code of the first and second optical conduits occurs via an optical time domain reflectometer.

7. A method comprising:
   providing a plurality of optical conduits including at least a first optical conduit figuratively divisible into a plurality of segments connected in series with each other and a second optical conduit figuratively divisible into a plurality of segments connected in series with each other;
   forming a multi-digit binary code on a portion of the segments of the first optical conduit and on a portion of the segments of the second optical conduit with the multi-digit binary code formed on the first optical conduit distinct from the multi-digit binary code formed in the second optical conduit;
   transmitting at least one light pulse through each of the optical conduits;
   using a reflected light resulting from the transmission of the light pulse along each of the first and second optical conduits to generate a multi-digit code; and
   distinguishing, based on the generated multi-digit code, at least the first optical conduit from the second optical conduit.

8. A method in accordance with claim 7, further comprising forming a series of Bragg gratings along a portion of the plurality of optical conduits, and wherein the utilizing reflected light resulting from the transmission of the at least one light pulse along the plurality of optical conduits to generate a multi-digit code comprises utilizing light reflected from the series of Bragg gratings to generate the multi-digit code.

9. A method in accordance with claim 8 wherein:
   forming the series of Bragg gratings along the portion of the plurality of optical conduits occurs in a manner such that the series of Bragg gratings extends along a portion of the plurality of optical conduits that is figuratively divisible into a plurality of segments connected in series with each other, and such that some of the segments comprise said Bragg gratings and other of the segments are devoid of said Bragg gratings; and the multi-digit binary code generated during the step of utilizing reflected light resulting from the transmission of the at least one light pulse along the plurality of optical conduits having a plurality of digits that are each associated with a separate one of the segments and that have one of first and second alternative states, the digits that are associated with one of the segments having a Bragg grating being in the first state and the digits that are associated with one of the segments that is devoid of a Bragg grating being in the second state.

10. A method in accordance with claim 9, wherein forming the series of Bragg gratings along the portion of the plurality of optical conduits occurs in a manner such that the plurality of segments into which the portion of the optical conduit is figuratively divisible are each of equal length.

11. A method in accordance with claim 7 wherein utilizing reflected light resulting from the transmission of at least one light pulse along the optical conduit to generate a multi-digit code occurs via an optical time domain reflectometer.

* * * * *